March 14, 1939.     S. SANTO     2,150,659
HAMBURGER STEAK FORMING MACHINE
Filed Dec. 16, 1936     2 Sheets-Sheet 1
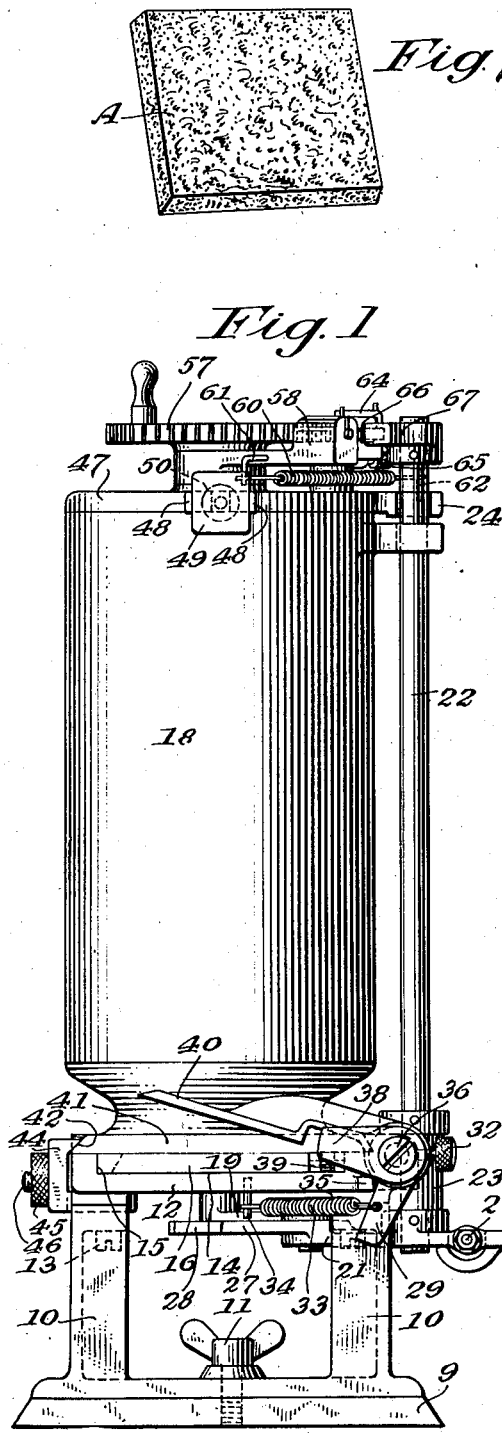
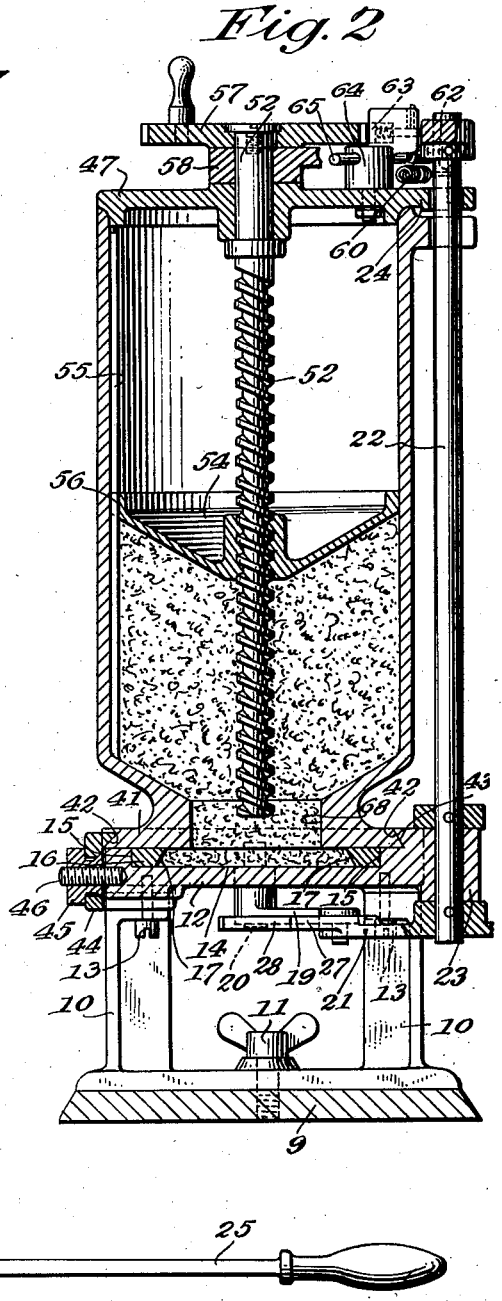
INVENTOR
Steven Santo
BY
C. M. Newman
ATTORNEY March 14, 1939.　　　　S. SANTO　　　　2,150,659
HAMBURGER STEAK FORMING MACHINE
Filed Dec. 16, 1936　　　2 Sheets-Sheet 2
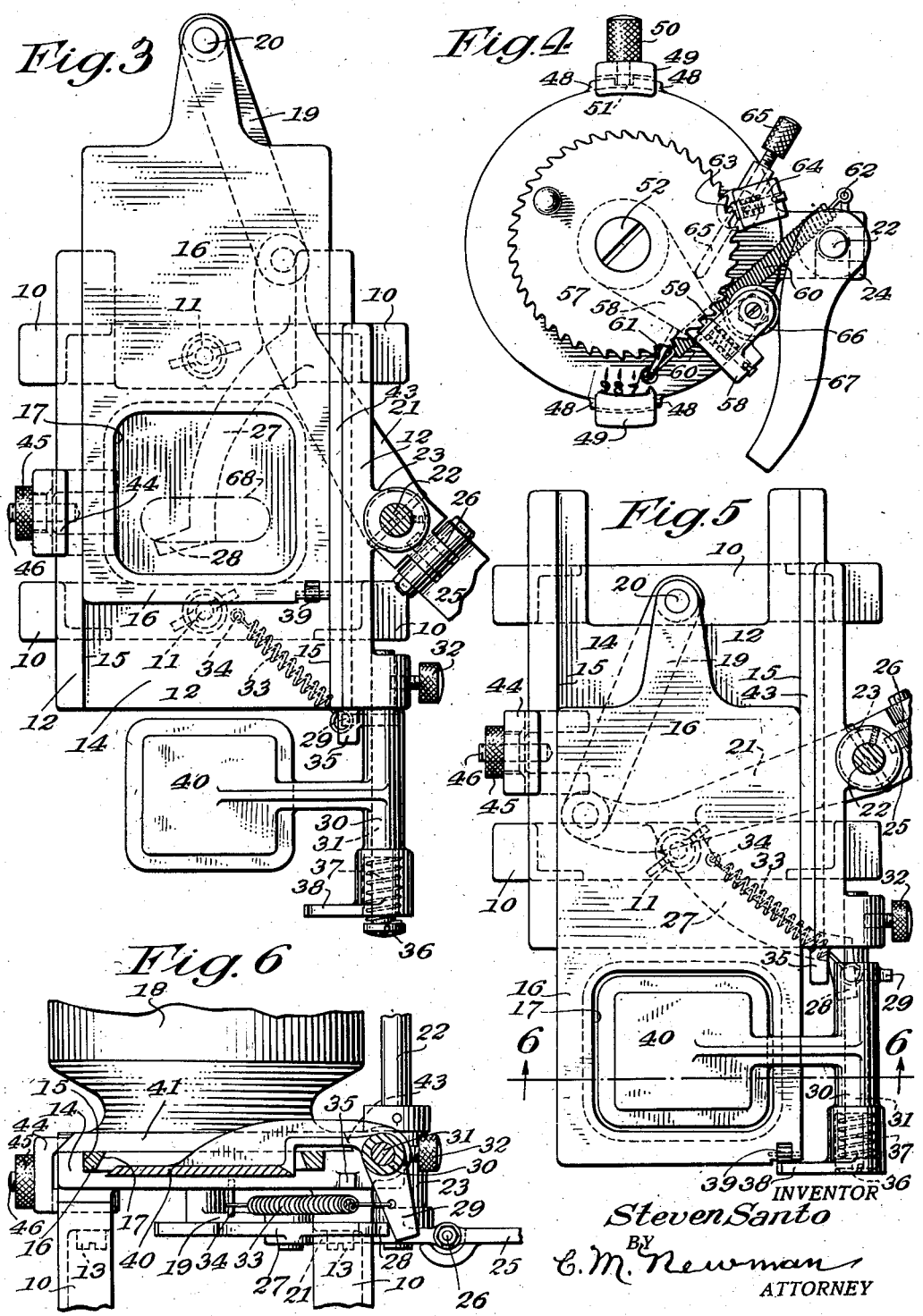

Patented Mar. 14, 1939

2,150,659

UNITED STATES PATENT OFFICE 2,150,659

HAMBURGER STEAK FORMING MACHINE

Steven Santo, Torrington, Conn.

Application December 16, 1936, Serial No. 116,067

12 Claims. (Cl. 107—8)

My invention relates to new and useful improvements in machines for pressing and forming hamburger steaks, so called, from ground or chopped meat, and whereby meat cakes or other food products of uniform size and thickness may be rapidly produced by simply operating a single handle.

The invention includes a press wherein the previously prepared chopped steak is placed and tightly squeezed preparatory to and during the operation of the machine in a manner to shear off slices of meat of uniform size and weight.

One of the essential objects of my invention is to provide a fairly simple form of machine which when not in use can be quickly disassembled, scalded, cleaned and aired so as to insure proper sanitation in the production of steaks of this class.

Another object of the invention is to provide a machine whose capacity may be limited only by the size of the machine and which when ready for operation can be adjusted to cut steaks of various thicknesses so as to produce a desired number, say six or ten to the pound of meat, varying, in thickness only.

In practice the machine is loaded with fresh ground meat, sufficient in quantity for anticipated requirements whereupon the steaks are sliced off in rapid succession, the operator usually placing a piece of thin paper between each cake leaving them in relatively small piles upon a platter and thus placed in a refrigerator to be used as required throughout the day or evening.

Another feature of the invention is to provide means for regulating the feed pressure of the plunger upon the meat contained within the machine and whereby the cakes produced may be either flexible or relatively stiff, as desired, said pressure being synchronized with the respective slicing operations so that uniform pressure upon the meat is insured from the beginning and throughout the slicing operation.

Sanitation is also insured in the production of hamburger steaks with my machine since the same are produced without any possible contamination after the meat has been introduced directly into the machine. All movements occur automatic and without contact of the operator's hand to the meat as is commonly the case where steaks of this sort are formed by hand.

While the machine has been designed for producing hamburger steaks yet it will be obvious that other kinds of foods such for instance as butter, pastry or the like can be formed into cakes of the size herein disclosed or of different shapes and sizes by such modifications of the mold as may be necessary and therefore I do not want it understood that the use of the machine be necessarily limited to that of producing meat cakes.

In the drawings similar characters of reference are used to designate like parts throughout the several figures, and in which Fig. 1 shows a front elevation of my improved steak forming machine;

Fig. 2 shows a central vertical longitudinal section of the same machine, the operating handle being broken away;

Fig. 3 shows a slightly enlarged plan view of the lower portion of the machine, the cylinder and pressing mechanism being removed, the remaining parts being in their normal position;

Fig. 4 shows a top plan view of the machine shown in Fig. 1 though on a slightly enlarged scale;

Fig. 5 is a view similar to Fig. 3 though with the cake forming slide moved to its extreme forward position as when discharging a steak;

Fig. 6 shows a detail sectional view of the stripper mechanism, shown in operated position as for discharging a formed steak, taken on line 6—6 of Fig. 5, and Fig. 7 shows a perspective view of a hamburger steak or cake such as is pressed and formed by my machine.

Referring in detail to the characters of reference marked upon the drawings 9 indicates a metal base plate that is adapted to be screwed or otherwise fastened to a bench or table and to which standards 10 are fastened by means of thumb screws 11. A bed 12 is secured to the top of these standards by means of screws 13 and is provided with a slide way 14 having parallel straight edges 15 in which a forming plate 16 is slidably mounted, and which is not only adapted to slice off cakes of chopped meat A, see Fig. 7, but also to convey them from the machine. An opening 17 is formed in the central portion of this plate to receive the meat from the cylindrical hopper 18, and thus forms a pocket or mold in which the meat cakes are formed. In this connection it will be seen that the top surface of the beforementioned bed 12 serves to form a temporary bottom for this mold while being filled and while being moved forward for discharge.

The slide plate 16 which is mounted for reciprocatory movement is operated through a link 19 one end of which is connected to the slide at 20 and the other end to a lever 21 that is secured to a rocker shaft 22 journaled in a bearing 23 of the bed 12 and in an upper bearing 24 in the cover of the hopper 18. An operating handle 25 is connected to the lower end of the said shaft 22 for rocking the same and thereby reciprocating the slide. This handle is preferably provided with a hinged joint 26 whereby it can be folded up out of the way when not in use.

An arm 27 is formed integral with the lever 20 so that its free end 28 will engage a short depending arm 29 on a sleeve 30 slidably mounted on a guide rod 31 that is secured to the bed by means of a screw 32. One end of a spring 33 is secured to this short arm 29 and the other end to a pin 34 in underside of the bed and serves to normally hold the said short arm up against a stop 35 formed on the front end of the bed, and the stripper 40 in its raised position as indicated in Fig. 1. The outer end portion of the hole through the sleeve 30 is enlarged slightly to accommodate the head of a screw 36 on the rod 31 and also a spring 37 seated between said head and an internal annular shoulder formed by the enlargement, which spring obviously exerts pressure against the sleeve and tends to normally hold the sleeve against the end of the bed 12. An arm 38 is formed on the forward end of the sleeve and serves to be engaged by a roller 39 carried in the forward end of the slide 16 for the purpose of moving the sleeve and its stripper 40 longitudinally with respect to the rod. The stripper is now positioned over the opening 17 and moves along with the slide plate during the remainder of its forward movement and its initial return movement. This engagement of the roller 39 with the arm 38 takes place at the instant the opening 17 in the slide plate comes under the stripper following this and with the longitudinal movement of the sleeve and slide plate the end 28 of the arm 27 engages the short arm 29 in a manner to move the sleeve and the stripper down until the latter engages the formed meat cake preparatory to ejecting the same which obviously takes place at the end of the forward stroke of the slide plate.

This relatively short combined movement of the slide plate and stripper is to cause the opening 17 in the slide plate to fully clear the bed 12 of the machine and likewise to allow additional time for the preliminary downward movement of the stripper so that it will be in engagement with the formed meat cake in a manner to loosen and strip the same while the slide is reaching its extreme forward position, thus to insure the cake dropping free of the machine and permitting a quick upward return movement of the stripper so that the slide will be free to continue in returning to its loading position, since all parts are properly associated in timed relation to insure rapid operations and production of meat cakes by the simple backward and forward movement of the hand lever.

The hopper 18, before mentioned is preferably of an elongated cylindrical form and is supported upon the bed 12. It has a substantially rectangular bottom end portion 41 that has opposite parallel beveled edges 42—42 one of which engages a beveled guide way 43 on one side of the bed and above the before-mentioned straight edge 15 while the other beveled edge is engaged by a beveled edge clamping member 44 which is supported, see Figs. 1, 2 and 3, on the edge of the bed and secured thereto in a manner to clamp the said edge portion 42 to the base by means of a nut 45 which engages a screw 46 secured in said bed. From this it will be seen that a quick removal of the cylindrical hopper is made possible simply by loosening the said nut 45 and its clamp 44 which serves to secure the hopper to the base. 47 represents a cover for the cylindrical hopper which is secured thereto, see Fig. 4, by means of lugs 48 formed on the edge of the cover and adapted to be turned in under the projections 49 formed on the side of the cylinder, one of which is provided with a screw 50 to engage a socket 51 in the said lugs 48 so as to not only hold the cover down snugly upon the top end of the cylinder but to also prevent it from turning. A feed screw 52 which has its upper end portion 53 journaled in a bearing of the cover is positioned centrally within the hopper and serves, by rotations, to move the plunger 54 with which it is threadably connected, up and down within the cylinder according to the direction in which the said screw is operated. An elongated spline 55 is provided within and against the cylindrical wall to receive a notch 56 in the periphery of the plunger so as to prevent the same from turning and guide it down to vertical movements.

The said screw is operated through a ratchet wheel 57 which is secured thereto and an arm 58 loosely mounted upon the said screw as between the cover and the said ratchet wheel. The arm is provided with a spring actuated pawl 59 that serves to engage the teeth of the ratchet wheel and is provided with a spring 60 one end of which is secured to the arm as at 61 and the other end to a pin 62 secured to a projection of the cover. A detent pawl 63 is secured in a post 64 that is also fastened to the cover, said detent serving to hold the ratchet wheel, its shaft and plunger in an operated position during the return stroke of the ratchet arm 58. An adjustable stop screw 65 is mounted in the post 64 below the under surface of the ratchet wheel in line with the movement of the arm 58 to form a stop for the same against which it normally rests by the action of the spring 60. The purpose of this adjustment is obviously to permit different lengths of strokes for the ratchet arm and its pawl whereby the feed screw can be turned more or less to increase or decrease the feed as occasion may require. For instance, as the screw is now positioned, see Fig. 4, the feed is such as to produce six hamburger steaks to the pound of meat, whereas if the screw is tightened up, the throw of the lever 58 would be less, and seven hamburger steaks would be produced to the pound of meat. A further adjustment would make eight steaks and so on. The ratchet arm 58 carries a roller 66 that is engaged by the irregular shaped edge of an arm 67 that is secured to the upper end of the before-mentioned rocker shaft 22 so that with the movement of the slideplate also occurs a movement of the arm 67 and the ratchet arm 58 in a way to cause the feed screw to rotate and the plunger to descend causing the meat within the hopper below the plunger to be squeezed through the elongated opening 68 in the bottom 41 of the hopper and into the pocket 17 formed in the slide plate 16. As just stated the outlet opening 68 is in the bottom of the hopper 41, and not in the mold plate 16 as might be inferred from Fig. 3 where it has been indicated in dotted lines, better to show its relation to the normal position of the pocket 17 of the moldplate 16. In this respect it will be seen that this opening 68 is located slightly forward of the center of said pocket in the slide so that the preliminary movement of the plunger insures the filling of the forward portion of the pocket and the further and final filling as the pocket moves forward under said opening 68, it being understood of course that the plunger is being gradually fed down so long as any portion of the pocket remains below and in communication with the opening through the bottom of the hopper. In practice and with the hopper filled or partly filled with chopped meat a backward and forward movement of the hand lever will insure the production of a hamburger steak and the discharge of the same from the front of the machine. When the meat has all been worked up and it becomes necessary to clean the machine it can readily be done by first loosening the screw 50 which permits the top to be disconnected and the plunger removed. Then by loosening the nut 45 the clamp 44 can be detached and the cylinder taken off. This leaves the slide exposed so as to be removed. The shaft and its connected parts can likewise be disconnected if necessary. The parts 10 are detached from the plate by loosening the thumb screws all of which can be readily performed and the machine washed, dried and aired preparatory to reassembling.

Having thus described my invention what I claim and desire to secure by Letters Patent is:

1. A meat cake forming machine of the class described, comprising a bed having a guide way formed therein, a moldplate slidably mounted in said guide way and having an opening therethrough, a cylindrical hopper positioned upon the bed above the slidable moldplate, a screw actuated plunger within the hopper to force meat from the hopper into the opening in the moldplate, an operating handle hingedly connected to the bed, a lever connecting the handle and the slidable moldplate for reciprocating the latter to receive quantities of meat from the hopper and convey it from the hopper, means connected with the handle for operating the screw and its plunger to simultaneously force meat into the opening while the slidable moldplate is being operated, a hingedly mounted stripper adapted to move into registration with the opening in the moldplate when extended from the hopper, and means connecting the stripper with the operating lever for swinging the stripper to discharge cakes of meat from said moldplate.

2. A meat cake forming machine of the class described, comprising a bed having a guide way formed therein, a moldplate slidably mounted in said guide way and having an opening therethrough, a cylindrical hopper positioned upon the bed and above the slidable moldplate, compressing means within the hopper to force meat from the hopper into the opening in the moldplate, a rocker shaft, a handle connected to the lower end of the rocker shaft, an arm connecting the handle and the slidable moldplate for reciprocating the latter to receive quantities of meat from the hopper and convey it from the machine, a rocker shaft connecting the shaft and the compressing means to force meat into the opening while the slidable moldplate is being operated, a stripper slidably mounted in alignment with the slidable moldplate and adapted to be engaged by said plate and moved therewith, and means connected with the operating handle for rocking the stripper to engage a formed meat cake and discharge it from the moldplate.

3. A meat cake forming machine of the class described, comprising a bed having a guide way formed in its top side, a moldplate slidably mounted in said guide way and having an opening therethrough, a cylindrical hopper positioned upon the bed and above the slidable moldplate, compressing means within the hopper to force meat from the hopper into the opening in the moldplate, an operating handle, fulcrumed on the bed, an arm connecting the handle and the slidable moldplate for reciprocating the latter to receive quantities of meat from the hopper and convey it from the machine, and means connected with the handle for operating the compressing means to simultaneously force meat into the opening while the slidable moldplate is being operated, a guide rod extended from the bed, a stripper slidably and rockably mounted on the rod, spring means to normally hold the stripper out of the path of movement of the moldplate, means for operating the stripper to discharge a formed meat cake therefrom.

4. A meat cake forming machine of the class described, comprising a bed having a guide way formed in its top side, a moldplate slidably mounted in said guide way and having an opening therethrough, a hopper positioned upon the bed and above the moldplate, a stripper to register with the opening in the moldplate and having a bearing sleeve, compressing means within the hopper to force meat from the hopper into the opening in the moldplate, an operating handle, a lever connecting the handle and the slidable moldplate and having an arm adapted to engage the sleeve for operating the stripper to discharge cakes of meat from the moldplate, and means connected with the handle for operating the compressing means to simultaneously force meat into the mold while being operated.

5. In a meat cake forming machine, the combination with a bed, a moldplate slidably mounted on the bed and having an opening therein, a hopper, means for feeding meat from the hopper into the opening of the moldplate, a guide rod secured to the bed, a stripper including a sleeve rockably and slidably mounted on the rod, spring means to normally hold the stripper above the path of movement of the moldplate, spring means to hold the stripper in a normal position on the rod, means to engage the movable moldplate and stripper sleeve, the movable moldplate and stripper sleeve being so related as to cause engagement of the latter by the former and to cause the stripper to be moved with the moldplate, and means for operating the stripper to engage and discharge a meat cake therefrom.

6. A meat cake forming machine of the class described comprising a bed having a guide way formed in its top side, a moldplate slidably mounted in said guide way and having an opening therein, a hopper, a plunger and rotatable screw within the hopper to force meat from the hopper into the opening of the moldplate, a rocker shaft, an operating handle secured thereto, a lever connecting the handle and the slidable moldplate for reciprocating the latter to receive and discharge quantities of meat from the hopper, a pawl and ratchet means connecting the rocker shaft and the screw for rotating the latter.

7. A meat cake forming machine of the class described, comprising a bed having a guide way formed therein, a moldplate slidably mounted in said guide way and having an opening therein, a hopper, a feed screw within the hopper, a plunger threadably mounted on the screw, a ratchet wheel mounted on the feed screw, a pawl to engage and operate the ratchet wheel to turn the feed screw, a rocker shaft extending from the lower to the upper part of the machine, means connecting the upper end of the rocker shaft with the pawl and ratchet wheel, adjusting means to regulate the amount of rotation of the feed screw and movement of its plunger, an operating handle mounted on the rocker shaft, means connecting the rocker shaft and slidable moldplate for reciprocating the latter.

8. A meat cake forming machine of the class described, comprising a bed, a moldplate slidably mounted in the bed and having an opening therein, a hopper positioned upon the bed above the moldplate, clamping means for detachably securing the hopper to the bed, a cover plate for the hopper, clamping means for detachably securing the cover to the hopper to permit the quick assembling and disassembling of the machine, a feed screw journaled within the cover, a plunger mounted on the screw including means for guiding the plunger longitudinally within the hopper, ratchet means for rotating the screw to feed the plunger and force meat from the hopper into the opening of the moldplate, means for operating the moldplate and means connected with said last named means for simultaneously operating the ratchet wheel and plunger.

9. A meat cake forming machine of the class described, comprising a bed having a guide way formed therein, a moldplate slidably mounted in said guide way and having an opening therein, a hopper, means within the hopper to force meat therefrom into the opening of the moldplate, a rocker shaft, an operating handle secured thereto, a lever connecting the handle and the slidable moldplate for reciprocating the latter, a stripper slidably mounted on the bed and adapted to be engaged and moved by said moldplate in alignment with the opening of the moldplate, and means connecting the stripper and lever to discharge a meat cake when the moldplate reaches its extreme forward position.

10. A meat cake forming machine of the class described, comprising a bed having a guide way formed therein, a moldplate slidably mounted in said guide way and having an opening therein, a hopper, means within the hopper to force meat therefrom into the opening of the moldplate, an operating handle secured thereto, a lever connecting the handle and the slidable moldplate for reciprocating the latter, a stripper slidably and rockably mounted with respect to the bed, means to insure the engagement of the stripper by the moldplate, means connecting the stripper and lever for operating the stripper to engage and discharge a meat cake as the moldplate reaches its forward position, and spring means for returning the stripper to its normal position.

11. A meat cake forming machine comprising a bed having a guide way formed therein, a moldplate slidably mounted in said guide way and having an opening therethrough, a hopper positioned above the moldplate, means within the hopper to force meat therefrom into the opening of the moldplate, a stripper slidably and rockably mounted upon the bed, a lever for reciprocating the moldplate to receive and move quantities of meat from the hopper, the said reciprocatable moldplate being adapted to engage the stripper and move it horizontally therewith in alignment with the opening in the moldplate, means carried by the lever to engage the stripper and swing the same to engage and discharge a meat cake from the moldplate when the latter reaches its forward position, spring means to return the stripper to its normal position when the moldplate recedes.

12. A meat cake forming machine of the class described, comprising a bed having a guide way formed therein, a mold plate slidably mounted in said guideway and having an opening therethrough, a cylindrical hopper positioned on the bed above the slidable mold plate and having a closed upper end, a rotatable feed screw journaled in said closed end and extending down in the hopper, a plunger within the hopper in threadable engagement with the screw to force meat from the hopper into the opening of the mold plate by the rotation of the screw, a rocker shaft, one end portion of which is journaled in the base and the other in the upper end portion of the cylinder, an operating handle secured to the lower end of the rocker shaft, a link connecting the handle and the slidable mold plate for reciprocating the latter to receive and discharge quantities of meat from the hopper, operating connections from the upper end of the rocker shaft to the feed screw for operating the same and the plunger to simultaneously force meat into the opening while the slidable mold plate is being operated.

STEVEN SANTO.